Dec. 14, 1948.   W. H. CHURCHILL   2,456,554
CONNECTOR FOR CORDS OR CABLES
Filed Oct. 12, 1945
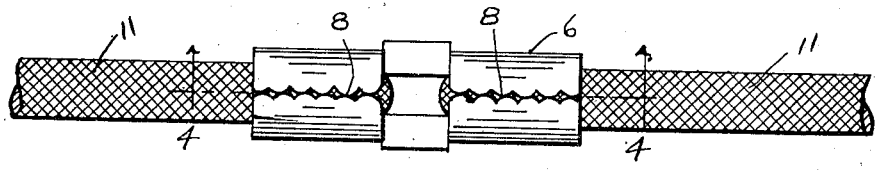
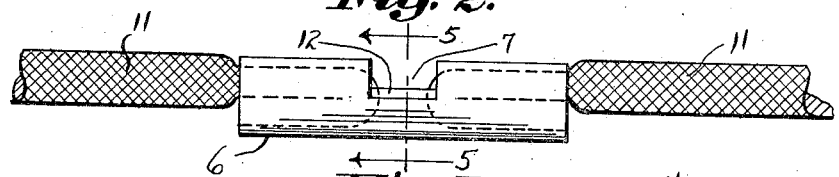
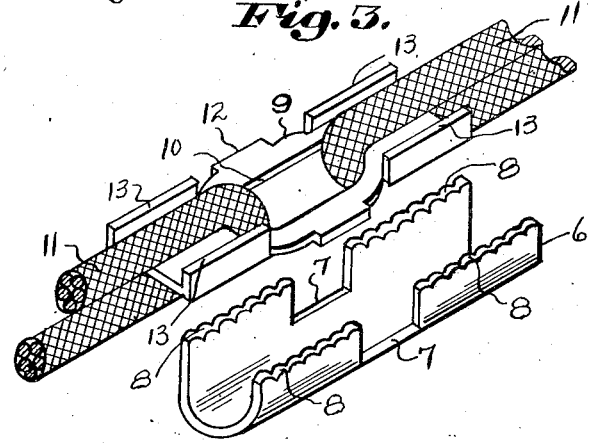
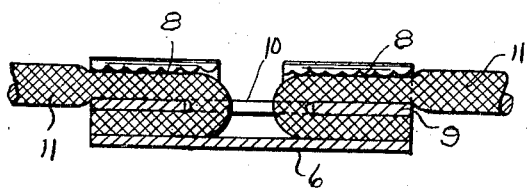
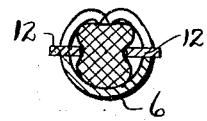
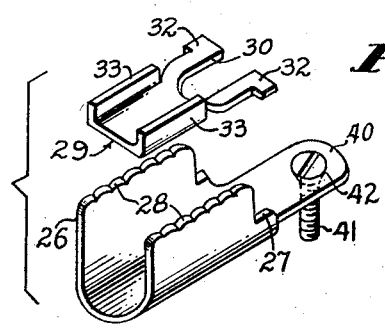
Inventor
Wilmer H. Churchill.
By Walter J. Jones
Attorney Patented Dec. 14, 1948

2,456,554

UNITED STATES PATENT OFFICE 2,456,554

CONNECTOR FOR CORDS OR CABLES

Wilmer H. Churchill, Saugus, Mass., assignor to United-Carr Fastener Corporation, Cambridge, Mass., a corporation of Massachusetts Application October 12, 1945, Serial No. 621,914

3 Claims. (Cl. 24—123)

The present invention relates to connectors for cords, cables, wire and the like, and aims generally to improve existing connectors of that type.

One of the principal aims and objects of the invention is the provision of a cord connector of simple construction that would more effectively resist separation of the cords than heretofore.

More particularly, the invention relates to the improvement of connectors by the provision of a light, simple and easily attached device that is particularly adapted for joining elastic cord, principally due to the fact that an end of each of the cords to be joined is looped around a snubbing member located inside a sleeve of the connector, the principal clamping or crimping action of the sleeve being exerted on the portion of the cords beyond the bights of the ends to be joined.

Other aims and advantages of the invention will be apparent to those skilled in the art from a consideration of the accompanying drawings and annexed specification, illustrating and describing one preferred embodiment of the invention.

In the drawings

Fig. 1 is a top plan view of an installation embodying my improved connector;

Fig. 2 is a side elevation thereof;

Fig. 3 is an enlarged perspective view of my improved connector before assembly, showing the cords in place;

Fig. 4 is an enlarged longitudinal sectional view of my connector taken on the line 4—4 of Fig. 1;

Fig. 5 is a transverse sectional view thereof taken on the line 5—5 of Fig. 2; and Fig. 6 is a perspective view of another embodiment of my improved connector shown before assembly.

Referring to the drawings, my improved connector preferably comprises an outer sleeve and an inner snubbing member. The outer sleeve or casing 6 is constructed initially of U-shaped cross section as shown in Fig. 3, and may be made of brass or other sheet metal of sufficient thickness and proper ductility to permit crimping about the ends of the cords to be joined. The length of the sleeve 6 is such as to give sufficient crimp to withstand the pull on the connector to be encountered in use. Notches 7 are provided at the mid portion of the sleeve 6 and cut into the open legs thereof for a distance approximately half way down said legs. Serrated edges 8 are provided along the upper edges of the sleeve 6 on each side of the notch 7. These serrations serve to increase the gripping action of my connector when in use, as will be more fully explained.

The snubbing member of my connector may be in the form of a flat plate 9 having at least one cord-receiving aperture 10 therein. In the illustrated ambodiment the plate 9 is provided with an elongated aperture 10 at its center of sufficient size to receive two cords 11 therethrough. The plate 9 also has laterally projecting tabs or shoulders 12 at its mid portion adapted to fit in and be positioned in the notches 7 of the sleeve or casing 6. The portions of the sides of the plate 9 are preferably flanged to provide shoulders 13 which serve to properly position the snubbing member in the casing, resisting tilting thereof as well as to prevent any tendency of the plate 9 to cut the sleeve 6 during the crimping operation. The proportions of the plate 9 are such that it is preferably approximately the same length as the sleeve 6 and may be slipped freely into the sleeve 6 when in the open position, the shoulders 12 sliding to the bottoms of the notches or recesses 7. The plate 9 as well as the sleeve 6 may be readily stamped from sheet stock in a press in any well known manner.

To assemble my connector, the ends of the cords 11 to be joined are passed upwardly through the hole 10 of the plate 9 and laid back on themselves on opposite sides of the plate 9 with the ends of the cords extending at least to the ends of the plate. The sleeve 6 is now slipped upwardly into position, the serrated edges of the sleeve preferably being on the same side of the plate 9 as the ends of the cords 11 to be joined, and the notches 7 engaging the tabs 12 of the plate 9. After the sleeve 6 is in position, the serrated edges 8 of the sleeve are bent down over the ends of the cords 11, compressing and gripping the ends and also forcing the plate 9 farther down the notches 7 so as to simultaneously compress the portions of the cords 11 lying under the plate 9. This bending or crimping operation may be manually performed by the use of a pair of pliers or similar tool specially designed for the crimping of connector sleeves.

It is essential for the best operation of my device that the proportions of my connector relative to the diameter of the cords to be joined be such that when in the crimped position the portions of the cord 11 below the plate 9 are under compression and the portions of the cord 11 above the plate 9 are both under compression and gripped by serrated edges 8. Also, it should be noted that preferably there is no lateral compression of the cord 11 as is best shown in Fig. 5, the contacting portions of the sleeve 6 on the cords being sufficient for most purposes, if limited to the top and bottom portions thereof. My device is so designed because the principal factor which resists withdrawal of the cords 11 is the snubbing action around the plate 9 of these cords, the bight of which is maintained principally by the pressure on the cords from the top and bottom.

The improved connector of the invention is adaptable to the securing of many types of cord as well as braided wire, but is particularly adjustable to securing elastic cord. Elastic cord tends, when placed under tension, to decrease in cross sectional area and has a tendency to pull out of the ordinary sleeve connector, even though crimped firmly. My connector will resist to the utmost withdrawal of the cords therefrom due to the novel arrangement of bight and crimp.

It is obvious that my invention will work equally well in connecting cord or the like to a terminal end, such as shown in Fig. 6. The terminal end may comprise an outer sleeve 26 provided with means for attachment to a support and an inner snubbing member. The construction of the outer sleeve 26 corresponds to that of the outer sleeve 6 of the connector shown in Figs. 1 to 5 of the drawing with a U-shaped cross section portion at one end with serrated edges 28 along the upper edges of the sleeve 26 and an attaching portion 40 at the other end having means such as an aperture 42 for receiving a machine screw 41 to attach the terminal end to a support and shoulders 27 disposed about half way down the sides of the legs adjacent the attaching portion 40. The snubbing member of the terminal end corresponds to that of the connector shown in Figs. 1 to 5 and comprises a flat plate 29 with a notch 30 at one end to receive the cord. On the side edges of the plate 29 are laterally projecting tabs or shoulders 32 adapted to fit in and be positioned in the shoulders 27 of the sleeve 26. Portions of the sides of the plate 29 are preferably flanged to provide shoulders 33 which serve to position properly the snubbing member in the casing 26 in the same manner as the shoulders 13 of the connector of Figs. 1 to 5 position the snubbing member of the connector. The terminal end of Fig. 6 is preferably proportioned as if it were the connector of Figs. 1 to 5 cut in half and an integral extension added along the cut edge to provide the attaching means. A cord is preferably assembled to the terminal end in the same manner as a cord is assembled to one end of the connector of Figs. 1 to 5.

Although I have illustrated and described one preferred form of my invention, I do not wish to be limited thereby because the scope of my invention is best defined by the following claims.

I claim:

1. A connector for cord and the like comprising: an elongated sheet metal sleeve member normally of U-shaped cross-section having side portions of deformable material and two notches, one in each side portion intermediate the ends thereof; and a snubbing member comprising an elongated plate provided with a centrally disposed aperture and two projections, one on each longitudinal edge of said plate intermediate the ends thereof; said snubbing member being disposed between said side portions and said projections being seated within said notches, said side portions curving inwardly with their adjacent edges being directed downwards towards said snubbing member, the distance between the under surface of said plate and the furthest underlying point on the inner surface of said sleeve member and the distances between the upper surface of said plate and the downward directed edges of said side portions each being less than the diameter of the cord to be gripped.

2. A connector for cord and the like comprising a snubbing member comprising an elongated plate having a centrally disposed aperture and projections extending from the longitudinal edges of said plate intermediate the ends thereof and an elongated sheet metal sleeve member normally of U-shaped cross-section having side portions of deformable material and notches in said side portions intermediate the ends thereof, said snubbing member being disposed between said side portions, said projections being seated within said notches, said side portions being deformable and adapted to be crimped so as to curve over the snubbing member and direct edges toward the adjacent face of said plate whereby two cord ends may be gripped and snubbed one at each end of the plate looped through said aperture with portions thereof gripped on each face of said plate.

3. A connector for cord and the like comprising a snubbing member comprising an elongated plate provided with shoulders on opposite edges and an elongated sheet metal sleeve member normally of U-shaped cross section having side portions of deformable material and notches therein, said snubbing member being disposed between said side portions, said shoulders being engaged in said notches, said side portions being adapated to be crimped so as to curve over the snubbing member and direct edges thereof toward the upper face of said plate whereby a cord may be gripped and snubbed by being looped with a bight at an edge and with portions thereof gripped on each face of the plate.

WILMER H. CHURCHILL.

REFERENCES CITED

The following references are of record in the file of this patent:

UNITED STATES PATENTS

| Number | Name | Date |
| --- | --- | --- |
| Re. 21,521 | Creamer | July 23, 1940 |
| 2,101,681 | Josephs | Dec. 7, 1937 |